M. E. KRAYBILL.
CUTTING APPARATUS FOR MACARONI, &c.
APPLICATION FILED NOV. 2, 1917.
1,286,028.
Patented Nov. 26, 1918.
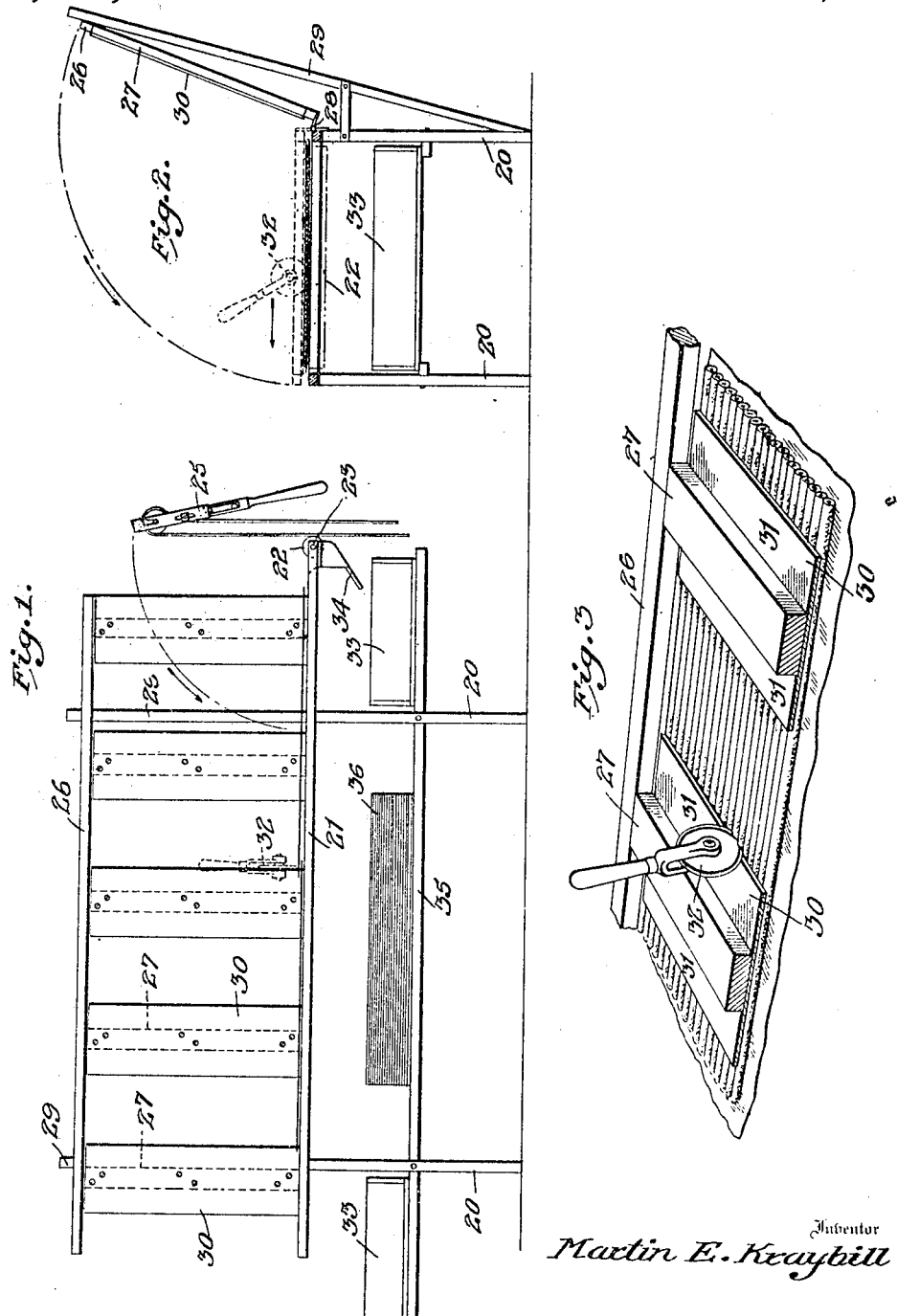
Inventor
Martin E. Kraybill
By Mason Fenwick & Lawrence,
Attorneys

UNITED STATES PATENT OFFICE.

MARTIN E. KRAYBILL, OF BOILING SPRINGS, PENNSYLVANIA.

CUTTING APPARATUS FOR MACARONI, &c.

1,286,028. Specification of Letters Patent. Patented Nov. 26, 1918.

Application filed November 2, 1917. Serial No. 199,914.

*To all whom it may concern:*

Be it known that I, MARTIN E. KRAYBILL, a citizen of the United States, residing at Boiling Springs, in the county of Cumberland and State of Pennsylvania, have invented certain new and useful Improvements in Cutting Apparatus for Macaroni, &c.; and I do hereby declare the following to be a full, clear, and exact description of the invention, such as will enable others skilled in the art to which it appertains to make and use the same.

This invention relates to the art of manufacturing macaroni, spaghetti, vermicelli and the like, and more particularly relates to a portion of the apparatus or system which I utilize in a method of manufacturing macaroni and the like which is disclosed in an application filed of even date herewith.

Heretofore in the old method of manufacturing macaroni and the like, the strands of the macaroni were gathered in sections of indefinite length at the press, the sections being cut off by the operator and arranged in a box and therein transported to a drying room where they were arranged in layers for drying and trimmed to the requisite size, this trimming involving considerable waste of material as well also as requiring double handling, and it is one of the objects of my present invention to provide an improvement for facilitating the gaging and cutting of strips of macaroni as they are drawn from the press into given length each and facilitate the arrangement of a batch of macaroni in a flat sheet or layer with the strands of the macaroni arranged in parallelism and over which a suitable cutter could be run transverse to the length of the sheet or strands and cut readily and quickly, and with the particular object in view of economizing in the amount of material and avoiding waste.

A further object of the present invention is to provide a gaging and cutting bench, table, or the like provided with suitable gage means for predetermining the length of each section of the strands of macaroni laid upon the table, and a gage means adapted to provide a guide for a suitable cutter whereby the sheet of macaroni strands could be severed into the requisite sections.

A further object in this connection is to provide a gaging and cutting table on which lengths or sections of macaroni taken from the press could be spread out full length of the sections as they are cut at the press, and these sections then trimmed at the ends and subdivided in their lengths without waste, means being provided for the reception of the trimmed ends of the lengths remaining after the intermediate sections of the strands have been divided.

A further object of the invention is to provide a table, bench, or the like upon which a sheet or layer constituting a batch of macaroni or the like is adapted to be laid, and involves the provision of anti-friction means at one end of the table or bench over which the sheet of macaroni strands could be drawn in the operation or step of laying the sheet out lengthwise flat upon the receiving surface of the table.

With these and other objects in view my present invention consists of an improved gaging or cutting table or bench involving a top or supporting surface to receive the sheet of macaroni strands to be gaged and severed, and consists further in a movable gage and guide frame adapted to be positioned over a layer of macaroni superposed on the table, and involves further an anti-friction means provided at the end of the table against which a vertically suspended portion of the sheet of macaroni would bear and roll when the batch is to be applied to the surface of the table by a drawing movement over its ends.

In the following specification there is described one embodiment of my invention which is illustrated in the accompanying drawings, in which:

Figure 1 is a front view of the gaging and cutting bench with the gaging frame arranged in elevated inoperative position with respect to the table top.

Fig. 2 is an end view of the table, and

Fig. 3 is an enlarged detail view of a fragment of the frame carrying the gage and guide plates.

In the illustrated form of the invention there is shown a suitable table or bench structure having legs 20 of suitable height which are provided at their tops with a flat table top 21 of suitable shape and dimensions, and over which a batch of strands of spaghetti, macaroni, or the like is adapted to be laid flatwise, the operator arranging the strands preferably in parallelism to each other, or practically so, so as to facilitate the cutting of them into uniform sections of given length. In practice a batch of macaroni strands is taken from a press, not necessary to be shown, and so arranged upon a suitable carrier that the strands are disposed in such manner as to form a substantially flat sheet or layer of length equal to the length of the strands, which, for instance, may be six feet or more according to the size of the sections into which the strands of macaroni are to be finally subdivided. This flatly arranged sheet or layer of macaroni is then carried to the table and applied to the top thereof through means of the carrier, and for the purpose of eliminating unnecessary friction against a surface of the vertically handing sheet of macaroni as it is applied to the table, for instance, at one end I provide thereon an anti-friction device of suitable character such, for instance, as a roller 22 provided in suitable bearings 23 against which the front or contiguous surface of a batch of macaroni may be placed while it depends from the carrying device utilized by the operator to bring the material to the table. Such a device is indicated at 25, and comprises a roller over which the batch of macaroni is spread out to form a layer, the roller being advanced over the top of the table, as shown in dotted lines, so that a portion of the sheet of macaroni will depend over the anti-friction roller 22 at the end of the table, and then as the roller 25 is advanced along the top of the table the depending portion of the macaroni sheet is drawn upwardly over the roller 22 and placed on the surface, while the overlying portion of the sheet of macaroni trailing behind the top of the roller 25 is gradually advanced over the top 21 of the table until the whole sheet has been laid flatly in position when the roller 25 is removed and the operator then deftly straightens the several strands of macaroni into parallel position if it should be crossed or twisted.

Preferably before the macaroni layer is applied to the table, one or more pieces of paper, preferably of absorbent material, are laid upon the top 21 of the table and over these the sheet of macaroni strands is applied in the manner above described. After the sheet of macaroni has been arranged it is then capable of being gaged into sections of suitable length between its ends by means of a gage frame, such, for instance, as illustrated at 26, and comprises longitudinally extending side bars or rails and a suitable number of transverse brace members 27, Fig. 3, the frame 26 being hingedly connected at 28 to the rear longitudinal edge of the top 21 of the table in such position that it may be folded downwardly over the applied layer of macaroni or the like. To support the frame 26 in an upright position any suitable means may be provided, and as here shown consists of suitably disposed and upwardly projecting braces 29 shown in Fig. 2.

The gaging and cutting frame 26 is provided with a suitable number of gaging and guide blades 30, shown in Fig. 3, these blades being preferably of resilient and flexible material, and may, for instance, consist of sheet metal and be suitably attached to the lower surface of the cross braces 27 of the frame 26, preferably the blades 30 being of such width with relation to the braces 27 as to provide an exposed area 31 on each side of the brace 27 along which the operator may run her hand to press the outer edge of the blade 30 snugly against the upper surface of the layer of macaroni when the frame 26 has been turned downwardly over the table top to rest upon the spread sheet of macaroni, and simultaneously as the operator advances her hand along a portion 31 of a gage blade 30 she may move a cutter 32 of suitable construction along the edge of the gage plate 31 so as to sever the several strands comprising the sheet of macaroni into sections, the length of which will be determined by the distance between the gage edges of the gage blade 30. While the length of the pieces of macaroni forming the sheet superposed upon the table top may be as required and as above given, for example, six feet long, it will be seen that by providing gage blades 30 each of a width of nine inches and spaced nine inches apart from each other, and parallel, that the six feet sections of macaroni forming the sheet will be subdivided into eight sections nine inches in length which are then ready to be removed from the table and placed in suitable drying trays for removal to the drying room or apparatus.

Of course it will be understood that with a cutting frame 26 provided with five gage blades 30 and spaced nine inches apart that it will be desirable to cut the sections of macaroni to form a sheet into a length a little more than six feet so as to provide for the accurate trimming of the ends of the sheet. The trimmings remaining over after the ends of the sheet have been separated by running the cutter along the respective guide edges of the gage 30 are adapted to be collected at the table by removal into suitable receptacles 33, one of which is shown as provided at each end of the table convenient for the reception of the trimmings, and that end of the table on which the roller 22 is mounted is provided with a transverse aperture or throat below which is arranged an apron 34 forming a guide or chute by which the trimmings from that end of the sheet on the table top may be dropped and thence discharged into the receptacle 33 placed therebelow on a suitable shelf 35 which extends along the table legs 20 projecting at each end thereof to provide for the support of the receptacle 33, the central portion of the shelf 35 also providing for the reception of a stack of sheets of paper 36, thus holding these convenient for the operator to spread in suitable relation upon the table top 21 to receive a layer or sheet of macaroni.

From the above it will be seen that after the paper sheets from the stack 36 have been applied to the top of the table and a sheet of macaroni strands of requisite length to cover the sheets from end to end of the table are applied thereto, then the operator simply swings the frame 26 downwardly from its inoperative position to a position superimposed upon the sheet of macaroni, and by running the cutter 32 along the parallel edges of each of the gage blades 30 the macaroni strands are subdivided into sections of uniform length. To insure the firm holding or retention of the strands of macaroni beneath the blades 30 these latter preferably are sufficiently flexible to bend down under pressure of the hand of the operator as she moves her hand along the edge of a blade in co-incidental relation to the movement of the cutter 32. After all of the sections into which the sheet of macaroni is to be divided have been severed by the operation of the cutter or knife, then the operator simply lifts the gage frame 26 to the upright position shown in Fig. 2 after which she lifts the sheets containing the sections of macaroni from the top of the table and disposes them upon a suitable truck bearing trays, not necessary to be here shown, which trays are removed to a suitable drying room or apparatus.

What I claim is:

In apparatus for use in the manufacture of macaroni or the like, a supporting surface upon which a batch of strands of the material may be laid in a flat sheet or layer, and means for gaging the layer into sections of given length each and forming a guide for a cutter movable along the gage edges, said means including flexible parallel spaced transverse presser blades along which the operator may run one hand while a cutter is concurrently and coincidentally operated along the contiguous edges of the blades.

In testimony whereof I affix my signature.

MARTIN E. KRAYBILL.

Copies of this patent may be obtained for five cents each, by addressing the "Commissioner of Patents, Washington, D. C."